(12) United States Patent
Baldwin

(10) Patent No.: US 7,939,757 B1
(45) Date of Patent: May 10, 2011

(54) SPLIT LID WHILE-IN-USE ELECTRICAL DEVICE COVER

(75) Inventor: Jeffrey P. Baldwin, Phoenix, AZ (US)

(73) Assignee: TayMac Corporation, Gilbert, AZ (US)

(*) Notice: Subject to any disclaimer, the term of this patent is extended or adjusted under 35 U.S.C. 154(b) by 282 days.

(21) Appl. No.: 12/202,483

(22) Filed: Sep. 2, 2008

Related U.S. Application Data

(60) Provisional application No. 60/972,149, filed on Sep. 13, 2007.

(51) Int. Cl.
  *H02G 3/18* (2006.01)
(52) U.S. Cl. ............. 174/67; 174/66; 439/135; D13/177
(58) Field of Classification Search .............. 174/66, 174/67; 220/241, 242; 439/135, 136, 373; D8/353; D13/177
  See application file for complete search history.

(56) References Cited

U.S. PATENT DOCUMENTS

| | | | |
|---|---|---|---|
| 4,109,095 A * | 8/1978 | Kling et al. ................. | 174/67 |
| 4,424,407 A | 1/1984 | Barbic | |
| D354,736 S | 1/1995 | Hallett et al. | |
| 6,133,531 A | 10/2000 | Hayduke et al. | |
| D460,421 S | 7/2002 | Marozsan, Jr. | |
| 7,097,474 B1 * | 8/2006 | Naylor ..................... | 439/135 |

* cited by examiner

*Primary Examiner* — Dhiru R Patel
(74) *Attorney, Agent, or Firm* — Booth Udall, PLC

(57) ABSTRACT

A split lid while-in-use electrical device cover is disclosed, including a base configured to couple to an electrical outlet, the electrical outlet being disposed within a wall, the base including an edge adjacent to the wall, and the edge including at least one hinge; a split lid configured to enclose the electrical outlet and including at least one swingable lid section, the swingable lid section joined to the base via the at least one hinge and swingable upon the at least one hinge; and a cord port in the split lid. The cord port may be a downwardly opening cord port or a rearwardly opening cord port. The device may also include a tab for opening and closing the device, a biasing mechanism for biasing the device closed, and a seam. Also disclosed is a method of protecting an electrical outlet using the split lid while-in-use electrical device cover.

19 Claims, 4 Drawing Sheets

SPLIT LID WHILE-IN-USE ELECTRICAL DEVICE COVER

CROSS-REFERENCE TO RELATED APPLICATIONS

This application claims priority to the earlier filed provisional patent application entitled "Split Lid While-In-Use Electrical Device Cover," Ser. No. 60/972,149 filed Sep. 13, 2007, the disclosure of which is hereby incorporated herein by reference.

BACKGROUND

1. Technical Field

This invention generally relates to covers for electrical devices, and more specifically relates to a split lid while-in-use electrical device cover and methods for installing and using the same.

2. Background Art

Electrical devices used in conjunction with electrical device boxes vary and include electrical outlets (both standard and ground fault current interrupts), light switches (both toggle and rocker plates), rounds, and cable television and/or telephone ports. Conventional covers for electrical device boxes are designed to try and prevent inadvertent access to the electrical conductive elements of electrical devices and/or to protect the electrical conductive elements from environmental conditions such as rain, sleet, snow, moisture, dirt, dust, and so forth.

SUMMARY

In an aspect, this document features a split lid while-in-use electrical device cover, comprising: a base configured to couple to an electrical outlet, the electrical outlet being disposed within a wall, the base comprising an edge adjacent to the wall, and the edge comprising at least one hinge; a split lid configured to enclose the electrical outlet and comprising at least one swingable lid section, the swingable lid section joined to the base via the at least one hinge and swingable upon the at least one hinge; and a downwardly opening cord port in the split lid.

Implementations may include one or more of the following:

The edge may comprise two hinges, the split lid may comprise two swingable lid sections, and each swingable lid section may be joined to the base via one of the hinges and swingable thereupon. The split lid may further comprise at least one immovable lid section permanently joined to the base. The edge may further comprise at least one long section and at least one short section and the hinge may be located on the at least one long section. The split lid may further comprise a seam configured to form an environmental seal upon closure of the split lid. The split lid while-in-use electrical device cover may further comprise a biasing mechanism configured to bias the split lid to a closed position. The biasing mechanism may comprise a spring and a spring mount. The split lid while-in-use electrical device cover may further comprise a tab configured to aid a user to easily open and close the split lid. The downwardly opening cord port may comprise two downwardly opening cord port sections, the two sections together forming the downwardly opening cord port upon closure of the split lid.

In another aspect, this document features a split lid while-in-use electrical device cover, comprising: a base configured to couple to an electrical outlet, the electrical outlet being disposed within a wall, the base comprising an edge adjacent to the wall, and the edge comprising at least one hinge; a split lid configured to enclose the electrical outlet and comprising at least one swingable lid section, the swingable lid section joined to the base via the at least one hinge and swingable upon the at least one hinge; and a rearwardly opening cord port in the split lid.

Implementations may include one or more of the following:

The edge may comprise two hinges, the split lid may comprise two swingable lid sections, and each swingable lid section may be joined to the base via one of the hinges and swingable thereupon. The split lid may further comprise at least one immovable lid section permanently joined to the base. The edge may further comprise at least one long section and at least one short section and the hinge may be located on the at least one long section. The split lid may further comprise a seam configured to form an environmental seal upon closure of the split lid. The split lid while-in-use electrical device cover may further comprise a biasing mechanism configured to bias the split lid to a closed position. The biasing mechanism may comprise a spring and a spring mount. The split lid while-in-use electrical device cover may further comprise a tab configured to aid a user to easily open and close the split lid.

In another aspect, this document features a method of protecting an electrical outlet, comprising: coupling a base of a split lid while-in-use electrical device cover to the electrical outlet, the electrical outlet being disposed within a wall, the base comprising an edge adjacent to the wall, and the edge comprising at least one hinge; plugging a plug into the electrical outlet; enclosing a split lid of the split lid while-in-use electrical device cover, the split lid comprising at least one swingable lid section, the swingable lid section joined to the base via the at least one hinge and swingable upon the at least one hinge; and placing a cord of the plug into a cord port of the split lid during closure of the split lid.

Implementations may include one or more of the following:

The cord port may comprise a downwardly opening cord port and the step of placing the cord of the plug into the cord port may comprise placing the cord of the plug into the downwardly opening cord port of the split lid during closure of the split lid. The cord port may comprise a rearwardly opening cord port and the step of placing the cord of the plug into the cord port may comprise placing the cord of the plug into the rearwardly opening cord port of the split lid during closure of the split lid.

Particular implementations also include split lid while in-use electrical device covers designed for use with various types of electrical devices. Particular implementations also include split lid while in-use electrical device covers that may permit an electrical connector, such as a plug, to be inserted into an electrical device while the cover encloses the device. Particular implementations also include split lid while in-use electrical device covers that may be selectively mounted in either a horizontal or vertical orientation. Particular implementations may also include split lid while in-use electrical device covers that may be actively or passively biased closed. Particular implementations also include split lid while in-use electrical device covers that may include a latch on the split lid. Particular implementations may also include split lid while in-use electrical device covers that may permit one or both halves of a cover to be opened. The various implementations may be manufactured using conventional procedures known to those of ordinary skill in the art as added to and improved upon through the procedures described herein.

The foregoing and other features and advantages of the invention will be apparent from the following more particular description of embodiments of the invention, as illustrated in the accompanying drawings.

BRIEF DESCRIPTION OF THE DRAWINGS

The present invention and embodiments will hereinafter be described in conjunction with the appended drawings, where like designations denote like elements, and.

DESCRIPTION

Figure 1:
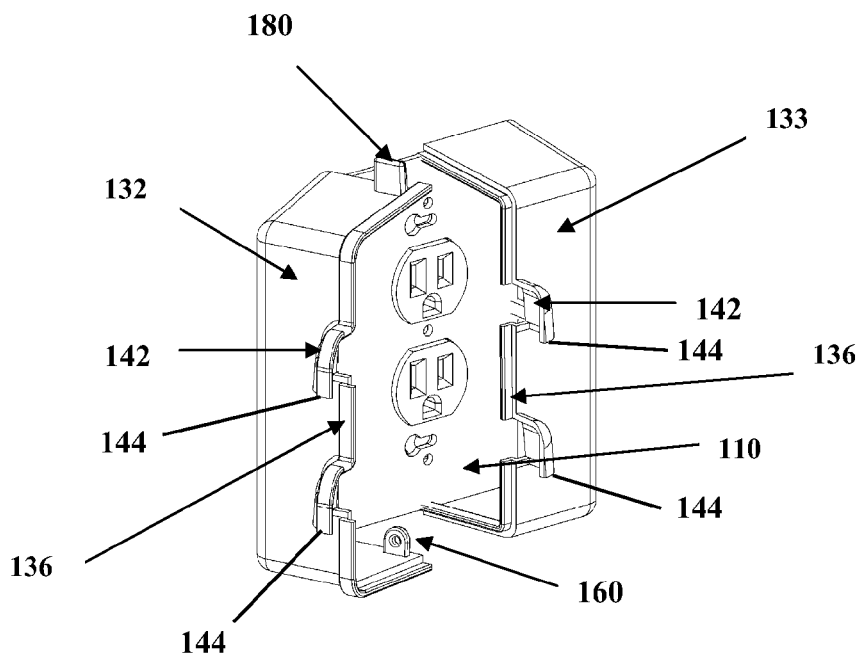
FIG. 1 is a perspective view of one embodiment of a split lid while-in-use electrical device cover in an open position.

There are many aspects of a split lid electrical device cover disclosed herein, of which one, a plurality, or all aspects may be used in any particular implementation.

The split lid while-in-use electrical device cover comprises a base 110, a coupler 120, a split lid 130, and a cord port 140 or 150. The coupler 120 may comprise a hinge. The cord port may comprise a downwardly opening cord port 140 and/or a rearwardly opening cord port 150. A downwardly opening cord port 140 may comprise a downwardly opening cord port section. The split lid 130 may comprise a swingable lid section 132, an immovable lid section 133, and a seam 134. The seam 134 may comprise a seam section. The split lid while-in-use electrical device cover may also comprise a biasing mechanism 170 to bias the split lid 130 to a closed position. The biasing mechanism 170 may comprise a spring and a spring mount. The split lid while-in-use electrical device cover may also comprise a tab 180 to aid the user in easily opening and closing the split lid 130.

Base

Figure 2:
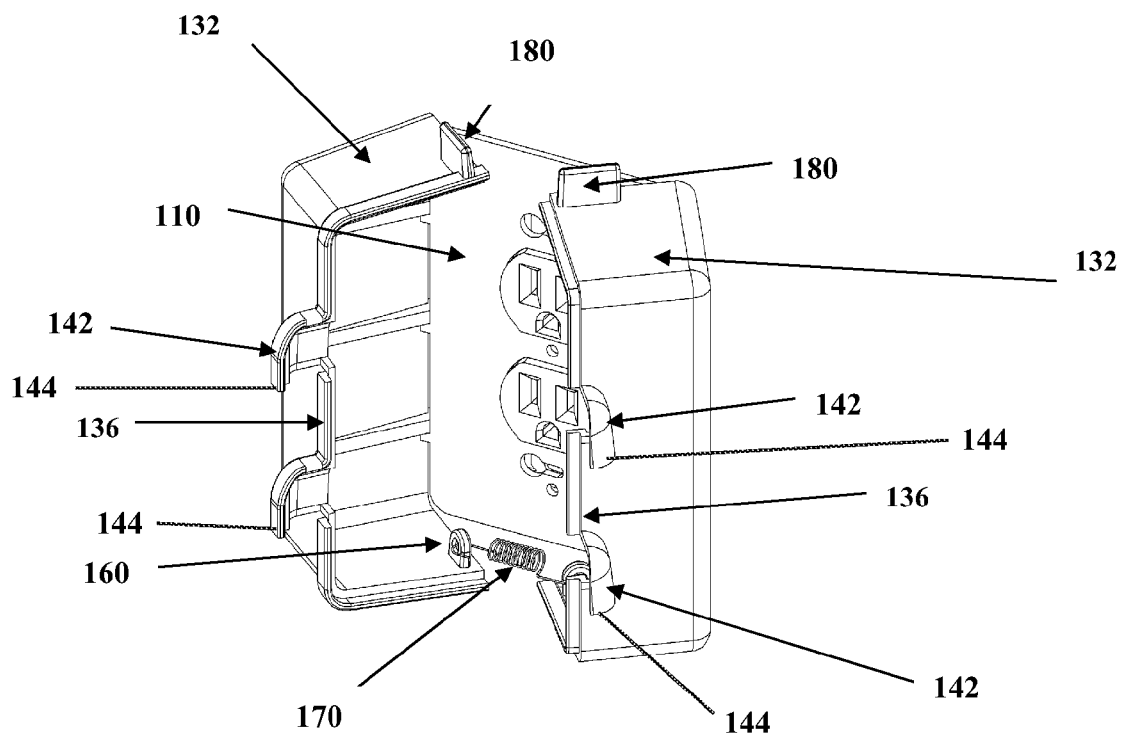
FIG. 2 is a perspective view of another embodiment of a split lid while-in-use electrical device cover in an open position.
Figure 7:
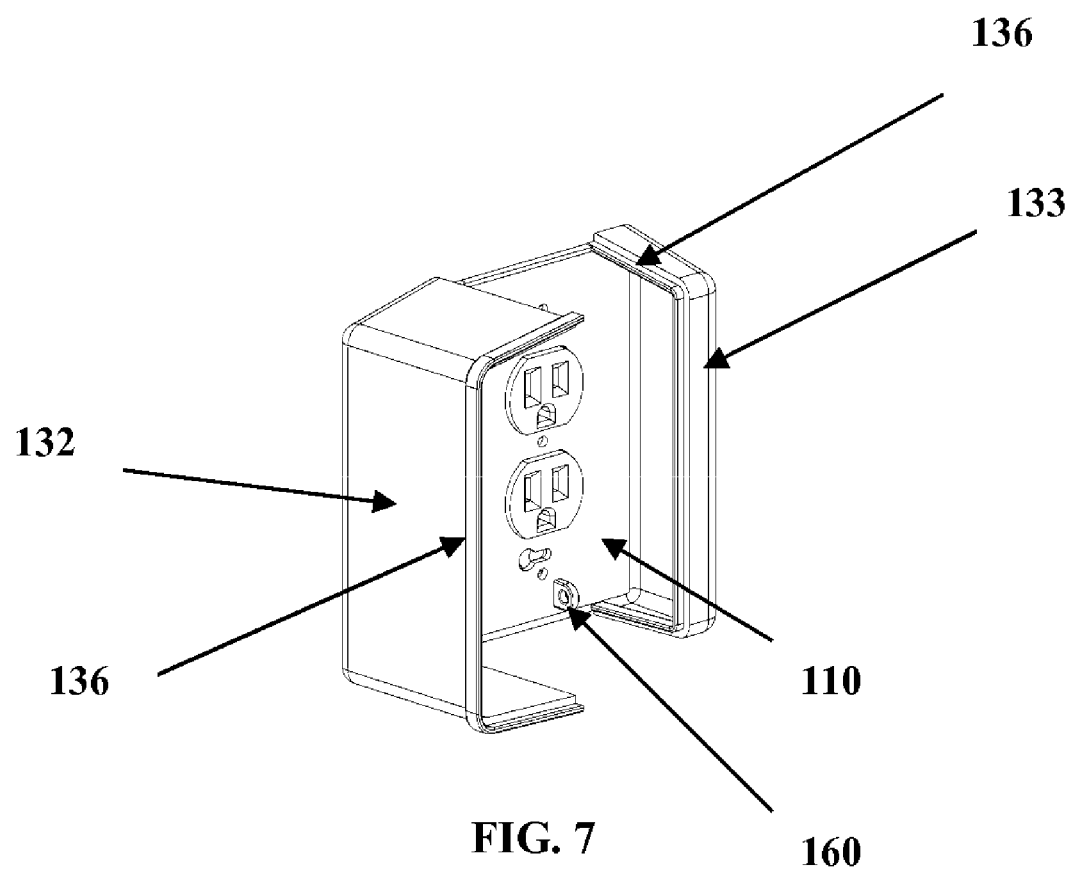
FIG. 7 is the embodiment of FIG. 6 in an open position.

Referring now to FIGS. 1-2 and 7, the split lid while-in-use electrical device cover comprises a base 110. The base 110 is configured to couple to an electrical outlet. The electrical outlet can be any type of electrical outlet such as a duplex outlet, a GFCI outlet, a round outlet, and so forth, and the base may be configured to couple to the many different varieties of electrical outlets that are available. The electrical outlet is disposed within a wall. "Wall" is herein defined as not just a standard wall within or outside a house, but also a floor, a ceiling, an outcropping such as an island in a kitchen area, and any other object wherein an electrical outlet may be feasibly installed. The base 110 comprises an edge adjacent to the wall, and the edge comprises a coupler 120 which couples the lid 130 to the base 110. Thus, as the edge is adjacent to the wall and the edge comprises the coupler 120, the coupler is also adjacent to the wall. The coupler 120 may comprise a hinge. The coupler 120 may be any other structure designed to couple the lid and base such as a flexible polymeric member, a passive hinge, and so forth. The coupler 120 may be biased to bias the lid into a closed position. The base may comprise one or more removable tabs (not shown) designed to allow the base to be converted from a configuration ready to receive one electrical device type to a configuration ready to receive another type. The base may also comprise selectively removable adapter plates with or without removable tabs configured to adapt the base for use with one or more different types of electrical devices. The base may be adapted for use with single or multi-gang electrical devices or outlets. Examples of bases with removable tabs and adapter plates are shown and described with reference to U.S. Pat. No. 6,642,453 to Shotey et al. issued Nov. 4, 2003, the disclosure of which is hereby incorporated herein by reference.

Split Lid

The split lid while-in-use electrical device cover comprises a split lid 130. The split lid 130 is configured to enclose the electrical outlet and comprises at least one swingable lid section 132, the swingable lid section 132 joined to the base 110 via the at least one coupler 120 and swingable upon the at least one coupler 120. The split lid 130 may also comprise an immovable lid section 133 permanently joined to the base 110. The split lid 130 may also comprise a seam 134. The seam 134 is configured to form an environmental seal upon closure of the split lid 130, such as to resist entry of moisture, rain, snow, dirt, dust, insects, animals, and so forth. The seam 134 may comprise one or more seam sections 136. For instance the seam 134 may comprise two seam sections 136, one on each of two portions of a split lid 130, as for instance where the split lid 130 comprises two swingable lid sections 132 and each swingable lid section 132 comprises a seam section 136 that upon closure of the split lid sections 132 forms a seam 134. Likewise in a scenario with one immovable lid section 133 and one swingable lid section 132 the immovable and swingable lid sections may each comprise a seam section 136 that upon closure of the swingable lid section 132 forms a seam 134. The environmental seal may be formed by overlapping one or more portions of a first portion 136 of the seam 134 from a first lid section 132 with a second portion 136 of the seam 134 from a second lid section 132 different from the first lid section.

Regarding a hinge 120, the swingable lid section 132 may be vertically or horizontally hinged (with respect to the ground) as the split lid while-in-use electrical device cover may be installed over a horizontally or vertically disposed electrical outlet. The edge may comprise two hinges 120, the split lid 130 may comprise two swingable lid sections 132, and each swingable lid section 132 may joined to the base via one of the hinges and swingable thereupon. For instance there may be hinges 120 located on opposite sides of the base 110 on the edge of the base 110, and the split lid sections 132 may swing thereupon, opening and closing to access and restrict access to the electrical outlet. The edge may further comprise at least one long section and at least one short section and the hinge 120 may be located on the at least one long section.

Figure 3:
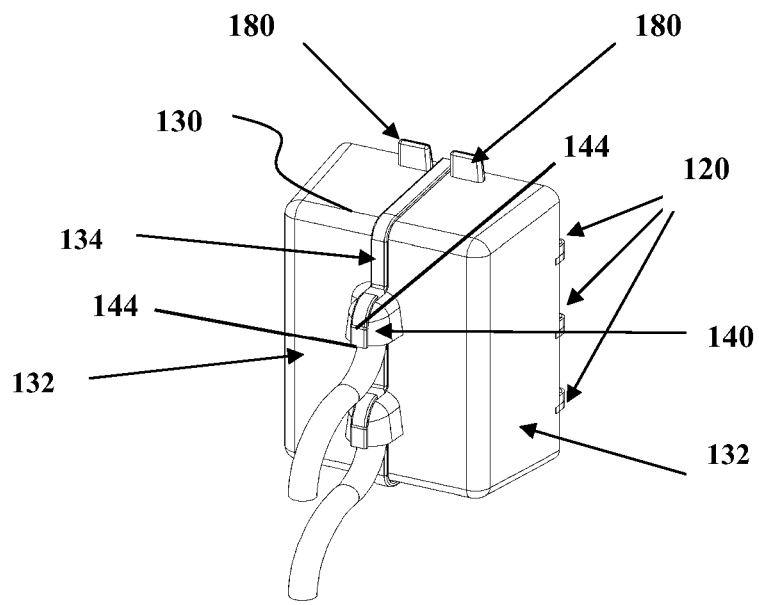
FIG. 3 the embodiment of FIG. 2 in a closed position.
Figure 6:
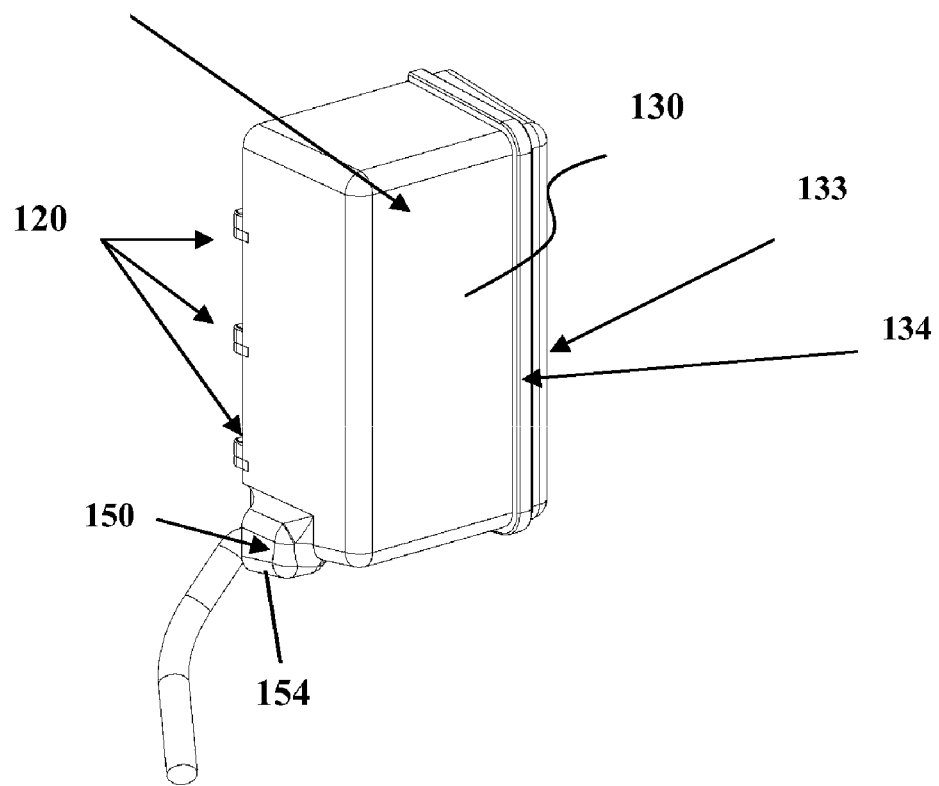
FIG. 6 is a perspective view of another embodiment of a split lid while-in-use electrical device cover in a closed position.

The two halves of a split lid while in-use electrical device cover may be formed in approximately equal proportions so that the seam 134 where the two halves meet is located in the approximate center of the cover, as illustrated in FIG. 3. Alternatively, as illustrated in the non-limiting example provided in FIGS. 6-7, the two halves of a split lid while in-use electrical device cover may be formed in unequal proportions so that the seam 134 where the halves meet is located elsewhere than in the approximate center of the cover. It is specifically contemplated that a split lid while in-use electrical device cover may encompass a cover and/or base of any size, shape, profile, configuration or dimension.

With regards to the swingable 132 and immovable 133 lid sections, one portion of a split lid may be fixed in position relative to the base or even formed as part of the base, while another portion may be allowed to hingeably open and close, as shown in FIGS. 1 and 7. As illustrated in the non-limiting example provided in FIG. 2, both portions of a split lid while in-use electrical device cover may be allowed to hingeably open and close relative to a base 110. By providing a user with a choice as to whether one or both sides of a split lid while in-use electrical device cover may open, a user is allowed to select a cover best suited to the application at-hand.

Cord Port

The split lid while-in-use electrical device cover comprises one or more cord ports 140 and 150. The cord port is configured to allow a cord of an electrical plug or connector to exit the split lid while-in-use electrical device cover even when the split lid 130 is closed. In this way an electrical device may be operable while the split lid 130 is closed and protects the plug and electrical outlet from the elements and/or environmental threats. Thus the electrical connector may be inserted into an electrical device or electrical outlet while the cover encloses the device. The cord port may be a downwardly opening cord port 140. Such a downwardly opening cord port 140 acts as a shield 144 to protect the cord and resist rain and other falling items from getting inside the split lid while-in-use electrical device cover. The term "downwardly" in this application is defined as generally towards the ground. The downwardly opening cord port 140 may comprise one or more downwardly opening cord port sections 142. For instance there may be one downwardly opening cord port section 142 on each of two split lid sections 132 that upon closure of the split lid sections 132 forms a downwardly opening cord port 140, similar to the seam sections 136 as described above. In other words the cord port 140 may be formed when the two halves of a split lid 132 while in-use electrical device cover are maintained in a closed position. A downwardly opening cord port 140 may be elbow shaped and may be configured to bend the cord from an outward direction to a downward direction.

The cord port may alternatively be a rearwardly opening cord port 150. The term "rearwardly" in this application is defined as generally towards the wall. The rearwardly opening cord port 150 acts to shield 154 and protect the cord and the electrical outlet from moisture, rain, dust, dirt, insects, and other environmental factors. In many implementations, the rearward opening will be pronounced, like in FIG. 6. In other implementations, the rearward opening may involve just a shield 154 that extends beyond the edge of the base 110 so that a portion of the shield 154 opening faces toward the wall. The cord port 150 may merely open at the corner or elsewhere at a seam between the base 110 and the split lid 130.

The cord port may be located on any area of the split lid while-in-use electrical device cover. For instance, in some of the illustrated embodiments the cord port is in the center of the front of the split lid while-in-use electrical device cover or on a lower corner, however the cord port could also be on the top, on the sides, on the bottom, anywhere on an edge or corner, and so forth. By providing a designer with a choice as to where a cord port 140 or 150 may be located, a designer may select a split lid while in-use electrical device cover that is best suited to the application at-hand.

Biasing Mechanism

The split lid while-in-use electrical device cover may also comprise a biasing mechanism 170 configured to bias the swingable lid section 132 to a closed position. If the swingable lid section 132 is horizontally hinged, the lid section 132 may be passively biased closed. The biasing mechanism 170 may additionally comprise any other biasing technique or method such as a magnet, a metallic or polymeric spring, a coil spring, a leaf spring, a vacuum spring, and so forth. In a particular implementation, such as that illustrated in FIG. 2, the biasing mechanism 170 may comprise a spring and a spring mount 160. The split lid while-in-use electrical device cover may include a mount onto which any other biasing mechanism may be coupled for actively closing a split lid electrical device cover. By providing a user with a spring or other biasing mechanism 170, a user is permitted to urge the split lid while in-use electrical device cover to a closed position.

Tab

The split lid while in-use electrical device cover may also comprise a tab 180 to aid in the opening and closing of the split lid 130. By providing a user with a tab 180 to aid in opening the device, a user has a choice as to the manner in which to open a split lid section 132.

Figure 4:
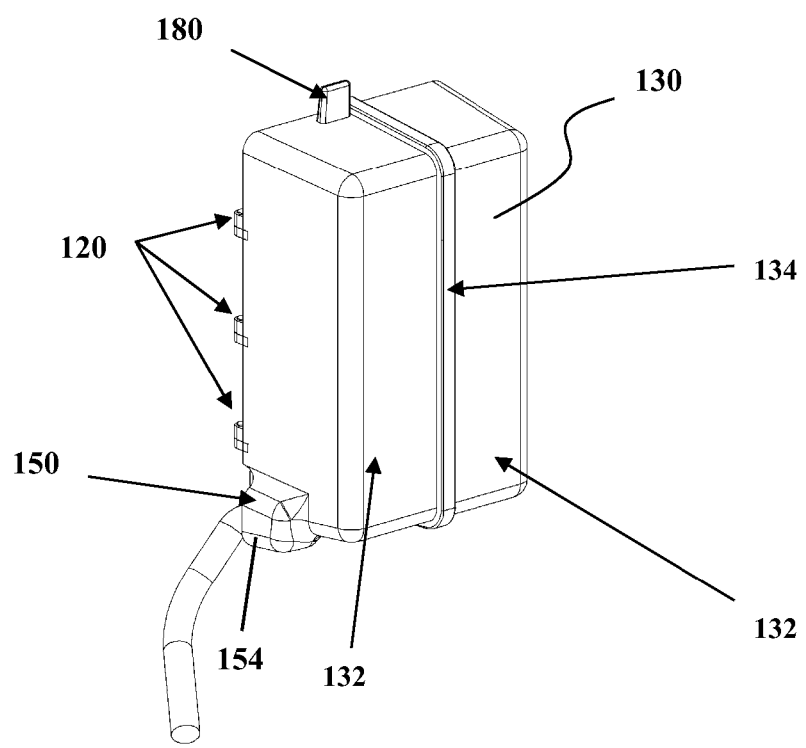
FIG. 4 is a perspective view of another embodiment of a split lid while-in-use electrical device cover in a closed position.
Figure 5:
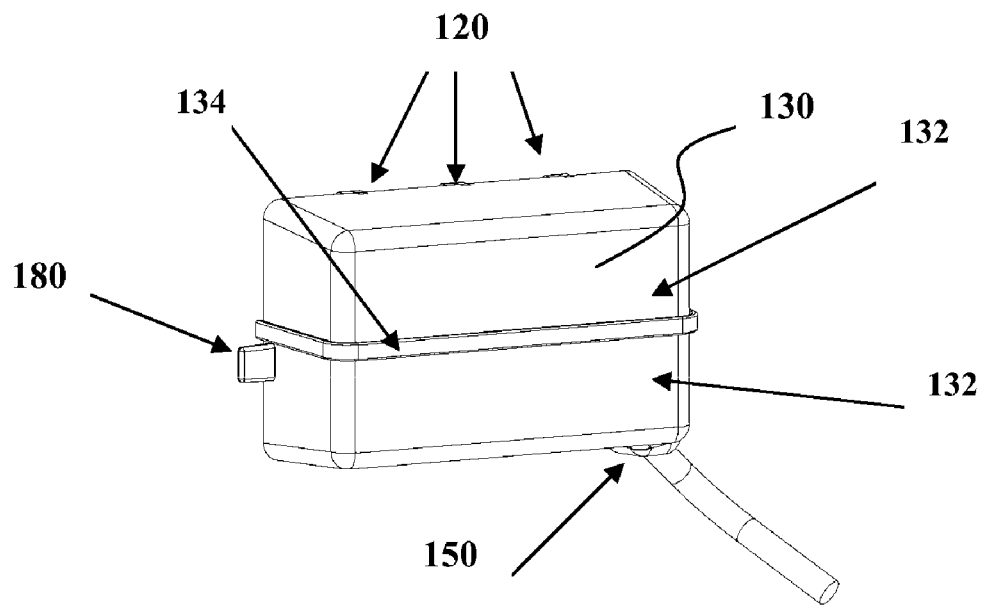
FIG. 5 is a perspective view of the embodiment of FIG. 4 installed horizontally.

The split lid while-in-use electrical device cover may also comprise other elements. For instance, it may comprise a locking mechanism or latch selected from a variety of locking mechanisms and latches used for securing a lid to a base when a cover is closed. In addition, as already mentioned and as illustrated in the non-limiting examples provided in FIGS. 4-5, a split lid while in-use electrical device cover may be selectively mounted in either a horizontal or vertical orientation. As illustrated by the differences between the horizontally-oriented cover example provided in FIG. 5 and the vertically-oriented cover example provided in FIG. 4, it should be clear that a split lid while in-use electrical device cover may be oriented in either a vertical or horizontal position. By providing a user with a choice as to the orientation in which to mount a split lid while in-use electrical device cover, a user may select the orientation best suited to the particular needs of the user. A user's needs may vary based on, among other things, the particular uses to which the split lid while in-use electrical device cover will be put.

From this disclosure, the implementations listed here, and many others, will become readily apparent to those of ordinary skill in the art. Those of ordinary skill in the art will readily understand the versatility with which this disclosure may be applied.

Implementations of split lid while in-use electrical device covers, and implementing components, may be constructed of a wide variety of materials known in the art for constructing electrical device covers. For example, the components may be formed of: metals; polymers such as thermoplastics (such as ABS, Fluoropolymers, Polyacetal, Polyamide; Polycarbonate, Polyethylene, Polysulfone, and/or the like); thermosets (such as Epoxy, Phenolic Resin, Polyimide, Polyurethane, Silicone, and/or the like), any combination thereof, and/or other like materials. Those of ordinary skill in the art will readily be able to select appropriate materials and manufacture these products from the disclosures provided herein.

Some components defining split lid while in-use electrical device covers may be manufactured simultaneously and integrally joined with one another, while other components may be pre-manufactured or manufactured separately and then assembled with the integral components. Various implementations may be manufactured using conventional procedures as added to and improved upon through the principles described here. Components manufactured separately may then be coupled or removably coupled with the other integral components in any manner.

It will be understood that implementations are not limited to the specific components disclosed herein, as virtually any components consistent with the intended operation of a method and/or system implementation for a split lid while in-use electrical device cover may be utilized. Accordingly, for example, although particular component examples may be disclosed, such components may comprise any shape, size, style, type, model, version, class, grade, measurement, concentration, material, weight, quantity, and/or the like consistent with the intended operation of a method and/or system implementation for a split lid while in-use electrical device cover may be used.

In places where the description above refers to particular implementations of a split lid while in-use electrical device cover, it should be readily apparent that a number of modifications may be made without departing from the spirit thereof. The presently disclosed implementations are, therefore, to be considered in all respects as illustrative and not restrictive.

While the invention has been particularly shown and described with reference to embodiments thereof, it will be understood by those skilled in the art that various changes in form and details may be made therein without departing from the spirit and scope of the invention. Accordingly, unless otherwise specified, any components of the convertible electrical device cover according to the present invention indicated in the drawings or herein are given as an example of possible components and not as a limitation. Similarly, unless otherwise specified, any steps or sequence of steps of the installation methods according to the present invention indicated herein are given as examples of possible steps or sequence of steps and not as limitations.

The invention claimed is:

1. A split lid while-in-use electrical device cover, comprising:
   a base configured to couple to an electrical outlet, the electrical outlet being disposed within a wall, the base comprising an edge adjacent to the wall; and
   the split lid while-in-use electrical device cover comprising a pair of lid sections that enclose the electrical outlet and a plug having a cord extending through a cord port defined by the pair of lid sections when the plug is inserted into the electrical outlet, the pair of lid sections comprising at least one swingable lid section coupled to the base with at least one hinge adjacent to the wall, the at least one swingable lid section being pivotable upon the at least one hinge; and,
   wherein the cord port comprises a cord port shield extending from each of the pair of lid sections and opens to face downward or rearward when the base is coupled to the electrical outlet.

2. The split lid cover of claim 1, wherein both of the pair of lid sections are swingable lid sections.

3. The split lid cover of claim 1, wherein at least one of the pair of lid sections is an immovable lid section.

4. The split lid cover of claim 3 wherein the immovable lid section is formed integral with the base.

5. The split lid cover of claim 1, further comprising a seam between the pair of lid sections and one of the pair of lid sections at least partially overlaps the other of the pair of lid sections when the split lid while-in-use electrical device cover is in a closed position.

6. The split lid cover of claim 5, wherein the seam is on a front surface of the split lid while-in-use electrical device cover.

7. The split lid cover of claim 6, wherein the seam is between the at least one swingable lid section and an immovable lid section when the split lid while-in-use electrical device cover is in the closed position.

8. The split lid cover of claim 5, wherein both of the pair of lid sections are swingable lid sections and the seam is between the swingable lid sections when the split lid while-in-use electrical device cover is in the closed position.

9. The split lid cover of claim 5 wherein the at least one swingable lid portion at least partially overlaps the other of the pair of lid sections.

10. The split lid cover of claim 5 wherein the seam is located off center with respect to the base.

11. The split lid cover of claim 1, further comprising a biasing mechanism coupled to the at least one swingable lid section and configured to bias the at least one swingable lid section closed.

12. The split lid cover of claim 11, wherein the biasing mechanism comprises at least one spring and at least one spring mount.

13. The split lid cover of claim 11 wherein the biasing mechanism is a spring mounted to each of the pair of lid sections.

14. The split lid cover of claim 1 further comprising at least one tab coupled to the at least one swingable lid section to aid a user in opening and closing the at least one swingable lid section.

15. The split lid cover of claim 1, wherein the cord port is positioned adjacent a corner of the base.

16. The split lid cover of claim 1 further comprising a plurality of cord ports defined by the pair of lid sections.

17. The split lid cover of claim 1 further comprising two cord ports defined by the pair of lid sections.

18. A method of protecting an electrical outlet with a split lid while-in-use electrical outlet cover comprising the steps of:
   providing a base with a pair of lid sections together defining a cord port having a cord port shield, wherein at least one of the pair of lid sections is swingable from an open position to a closed position;
   inserting a plug having a cord extending there from into the electrical outlet;
   aligning the plug with at least one half of the cord port;
   creating a seam on a front surface of the split lid while-in-use electrical outlet cover by overlapping one of the pair of lid sections with the other of the pair of lid sections; and,
   directing the cord downward with the cord port shield.

19. The method of claim 18 wherein the step of directing includes the step of directing the cord rearward with the cord port shield.

* * * * *